(12) United States Patent
Barber

(10) Patent No.: US 6,507,361 B1
(45) Date of Patent: Jan. 14, 2003

(54) ELECTRONIC PERSONALIZED IMAGING PRODUCTION SYSTEM INCLUDING MEANS FOR COMBINING FOREGROUND IMAGES WITH BACKGROUND IMAGES

(76) Inventor: Pamela Barber, P.O. Box 632, Ventura, CA (US) 93002-0632

( * ) Notice: Subject to any disclaimer, the term of this patent is extended or adjusted under 35 U.S.C. 154(b) by 0 days.

(21) Appl. No.: 09/602,932

(22) Filed: Jun. 23, 2000

Related U.S. Application Data

(63) Continuation of application No. 09/020,050, filed on Feb. 6, 1998, now abandoned, and a continuation of application No. 09/175,082, filed on Oct. 19, 1998, which is a continuation of application No. 08/183,592, filed on Jan. 18, 1994, now abandoned, which is a continuation-in-part of application No. 08/066,629, filed on May 24, 1993, now abandoned, which is a continuation of application No. 07/943,133, filed on Sep. 10, 1992, now abandoned, which is a continuation of application No. 07/669,664, filed on Mar. 14, 1991, now abandoned.

(51) Int. Cl.$^7$ ........................ H04N 5/225; H04N 5/262
(52) U.S. Cl. ................... 348/207.2; 348/239; 348/373; 396/2
(58) Field of Search ................................ 345/113, 114; 348/61, 207, 211, 213, 222, 373, 375, 584, 586, 589, 598, 599, 625; 382/254, 256, 266–269; 396/2, 3; H04N 5/262, 5/225

(56) References Cited

U.S. PATENT DOCUMENTS

| | | | | |
|---|---|---|---|---|
| 4,396,939 A | * | 8/1983 | Kitahama | 348/587 |
| 4,408,221 A | * | 10/1983 | McCoy | 348/587 |
| 4,568,981 A | * | 2/1986 | Beaulier | 348/589 |
| 4,755,881 A | * | 7/1988 | Bartlett | 348/838 |
| 5,001,558 A | * | 3/1991 | Burley | 348/164 |
| 5,117,283 A | * | 5/1992 | Kroos | 348/564 |
| 5,210,603 A | * | 5/1993 | Sabin | 348/157 |
| 5,345,313 A | * | 9/1994 | Blank | 348/598 |
| 5,381,184 A | * | 1/1995 | Gehrmann | 348/586 |
| 5,400,081 A | * | 3/1995 | Chaplin | 348/587 |
| 5,459,819 A | * | 10/1995 | Watkins | 358/1.18 |
| 5,574,511 A | * | 11/1996 | Yang | 348/586 |
| 5,587,740 A | * | 12/1996 | Brennan | 348/373 |
| 5,914,748 A | * | 6/1999 | Parulski | 348/586 |
| 5,923,406 A | * | 7/1999 | Brasington | 355/40 |
| 6,085,195 A | * | 7/2000 | Hoyt | 707/10 |
| 6,148,148 A | * | 11/2000 | Wain | 396/2 |

* cited by examiner

Primary Examiner—Ngoc-Yen Vu
(74) Attorney, Agent, or Firm—Brown, Martin, Haller and McClain LLP

(57) ABSTRACT

An apparatus and method for electronically printing a person's image onto a substrate having a predetermined site-specific background includes a compact, portable housing, and a camera that is movably mounted in the housing. An electronic printer and a microprocessor are also mounted in the housing and are electronically connected to the camera. In one embodiment, the microprocessor is a printer control board which receives an image of the camera's field of view and suppresses regions of the image that are substantially outside of the person's body image. The printer control board then causes the printer to print only the person's image onto a preselected blank area of the substrate. The remaining region of the substrate is preprinted with a site specific background. In an alternate embodiment, the microprocessor is a personal computer, and the personal computer electronically removes the person's image from the image of the background surrounding, electronically superimposes the person's image onto a site specific background stored in the is computer's memory, and causes the printer to print the composite image onto a blank substrate.

40 Claims, 4 Drawing Sheets

ELECTRONIC PERSONALIZED IMAGING PRODUCTION SYSTEM INCLUDING MEANS FOR COMBINING FOREGROUND IMAGES WITH BACKGROUND IMAGES

CROSS REFERENCE TO RELATED APPLICATIONS

This application is a continuation of application Ser. No. 09/020,050, filed Feb. 6, 1998, now abandoned and is also a continuation of application Ser. No. 09/175,082, filed Oct. 19, 1998, which is a continuation of Ser. No. 08/183,592, filed Jan. 18, 1994, now abandoned which is a continuation-in-part of application Ser. No. 08/066,629 filed May 24, 1993, now abandoned which is a continuation of application Ser. No. 07/943,133, filed Sep. 10, 1992 (abandoned), which is a continuation of application Ser. No. 07/669,664, filed Mar. 14, 1991 (abandoned), all of which are incorporated in this application in their entireties by this reference.

BACKGROUND OF THE INVENTION

The present invention relates generally to imaging devices. More particularly, the present invention relates to coin-operated devices which generate an image of a person on a predetermined background. The present invention particularly, though not exclusively, relates to portable electronic imaging devices and their methods of use.

Electronically-generated images of people are used in a large number of applications in which it is desirable for the person's image to be superimposed on a predetermined background. For example, it is desirable to superimpose a person's image onto a predetermined background to make identification cards and entertainment cards. Furthermore, a person may wish to create a customized postcard by electronically superimposing his or her image onto a predetermined background. Electronic imaging is increasingly preferred for these applications over traditional chemical based photography because electronic imaging does not generate environmentally hazardous residue, in contrast to chemical-based photography.

Not surprisingly, several devices have been introduced which provide a convenient and reliable means for imaging a person and superimposing the person's image onto a predetermined background. For example, U.S. Pat. No. 3,864,708 to Allen discloses a coin-operated photographic booth which produces a photograph of a person who can sit in front of a panoramic background in the booth. To obtain a picture using the Allen apparatus, a person steps into the booth and deposits an appropriate amount of currency in a currency acceptor that is operatively engaged with a camera located in the booth. When the appropriate amount of currency has been deposited into the acceptor, the camera is activated to image the person and produce an image of the person against the background in about 70 to 90 seconds.

While useful for its intended purpose, the Allen apparatus requires the use of environmentally hazardous chemicals to produce a photograph. Also, the Allen apparatus is not portable. Instead, the Allen apparatus is relatively large, bulky and difficult to move. Thus, the Allen device is not suitable for use in many commercial areas (e.g., shopping malls) which may have limited space.

U.S. Pat. No. 4,731,743, issued to Blancato, discloses an apparatus or capturing an image of a subject extracting the fact of the subject from the image and overlaying a pre-stored image of a selected hairstyle image over the extracted face to produce an image of what the subject would look like with the selected hairstyle. In the embodiment of the system described therein, the image processing is performed by a Macintosh computer sold by Apple Computer, Inc. The apparatus is designed to be operated by a hairstylist, who seats the subject, adjusts the lighting, and views the image produced. A template is provided for each hairstyle which indicates the position and angle of the subject's face required so that the hairstyle looks proper when overlaid on the subject's face. This template is placed on a screen displaying an image of the subject, and the hairstylist directs the subject as to the proper positioning of the subject within the view of the camera capturing the subject's image. Once the correct image is captured, the hairstylist outlines the subject's face on the image and the outline portion of the image is combined with the image of the selected hairstyle.

While such a system may be useful in a salon, where space would be available for the apparatus and where a hairstylist is available to orient the subject and indicate to the apparatus the outline of the subject so that the overlaid hairstyle looks right, the apparatus of Blancato does not address the need for a compact, portable, and automatic means for combining a foreground image of a subject with a pre-selected background. Furthermore, Blancato doesn't show the combination of the foreground image of a subject with a pre-selected background. Furthermore, Blancato doesn't show the combination of the foreground image of a subject and a background image, since the hairstyle is actually in the foreground relative to the image of the subject, thus avoiding a need to blend the irregular edges of the image of the subject with a background.

U.S. Pat. No. 5,117,283, issued to Kroos et al. (hereinafter "Kroos"), attempts to solve this problem. In the Kroos photo booth compositing apparatus, an image is captured of a subject in front of a backdrop, the foreground image of the subject is separated from the background image of the backdrop. The foreground image is then overlaid on a stored image of a different background to create an image with the illusion that the subject was in fact standing in front of the scene depicted by the stored background.

In order to effectively separate the foreground image of the subject from the background image of the backdrop in the combined image captured with a camera, an image data processor is provided to compare the captured image with a reference image formed by capturing an image of the backdrop in the booth without the subject present. The portions of the combined image which match with corresponding portions of the reference image are deemed to be in the background and the remaining portions are deemed to be in the foreground. For this to work, of course, the lighting of the backdrop when the reference image is captured must be the same as the lighting on the backdrop when the subject is in the booth, and this requires dedicated backdrop illumination.

When also considering that separate illumination is required to illuminate the subject, and that the illumination must be carefully controlled and that the entire apparatus must enclose the backdrop and the subject in a booth so as to not be affected by ambient light surrounding the booth, in order that the foreground portion of the image can be separated from the combined image, the apparatus becomes quite complex and large. Thus, the apparatus of Kroos also fails to provide a portable, inexpensive means for combining a foreground image of a subject with a stored background image.

U.S. Pat. No. 4,687,526, issued to Wilfert, shows a method of making an identification card where the image of a person is superimposed on a preprinted background. While such a system might be useful for superimposing fingerprints, signatures, and an image of a person's face, it does not create the necessary illusion that the person is standing in front of a background scene which was not actually behind the person when the image was taken. Typically, the person is photographed in front of a fixed color panel and the resulting image is cropped to fit into a rectangular space, showing the rectangular space not containing the image of the person.

U.S. Pat. No. 4,891,660 issued to Biondo, Jr. discloses a stand-alone automatic photographic system comprising a stand and a camera within a camera housing. However, while Biondo may show a compact photographic system, it does not disclose or suggest creation of a card showing a foreground image of a subject combined with a stored image of a background.

The present invention recognizes a need to provide a portable imaging apparatus which can create an electronic image of a person in predetermined background surroundings. Accordingly, one advantage of the present invention is a portable apparatus which can produce an electronic image of a person in response to the depositing of an appropriate amount of currency in the apparatus. It is another advantage of the present invention to provide an electronic imaging apparatus which can superimpose an image of a person onto a predetermined background and electronically print the composite image. A further advantage of the present invention is to provide an electronic imaging apparatus which is portable and relatively lightweight, and which is easy to use and cost-effective to manufacture.

SUMMARY OF THE INVENTION

An improved imaging apparatus is provided by virtue of the present invention.

A portable apparatus for forming, on a substrate, an electronic image of a person in predetermined background surroundings has a portable housing made of a suitable material such as fiberglass that has an opening. The portable apparatus is sufficiently compact to be conveniently installed in one of many different locations, e.g., shopping malls, or scenic locations in a national park.

The housing can be mounted on a counter top or other convenient surface. Alternatively, a base can be attached to the housing for supporting the housing above the ground. Also, a still camera or video camera is mounted on the housing and can be moved up and down by the person to be imaged to position the camera at the person's eye level. The camera includes a lens which defines a field of view, and the camera is mounted in the housing with the field of view of the lens oriented toward the opening. A pair of light sources are mounted on the housing and are spaced from each other for illuminating the person from two angles.

As envisioned by the present invention, an electronic printer may be mounted on the apparatus that is electrically connected to the camera. Furthermore, a microprocessor may be attached to the apparatus for controlling the printer.

More particularly, in one embodiment of the present invention, the microprocessor is a printer control board, and the substrate on which the person's image is to be formed is preprinted with the image of a predetermined background. This image of the predetermined background includes a preselected area that is blank, i.e., the preprinted substrate includes a blank area. In accordance with the present invention, the printer control board causes the printer to electronically print a preselected portion of the field of view of the lens onto the preselected blank area. Regions within the field of view of the lens that are nevertheless outside the preselected portion are suppressed by the printer control board, so that the printer does not print these regions. Thus, for example, the image of the person, with most of the actual background within the field of view of the lens suppressed, can be printed onto the preselected blank area. The substrate may be a postcard, an identification card or badge such as a driver's license, a souvenir card, a sticker, or an entertainment card.

In an alternate embodiment, the microprocessor is a personal computer or lap-top computer, and contains an electronic memory. A plurality of predetermined background images may be stored in the memory of the computer. In accordance with this embodiment, the person stands in front of a background of a suitable color, and the person is imaged by the camera. The person's image is transmitted from the camera to the computer, which removes the person's image from the blue background and electronically superimposes the person's image onto a selectable one of the predetermined background images which are stored in the computer's memory. The computer then causes the printer to electronically print the composite image of the person with the predetermined background onto a blank substrate.

The present invention may also advantageously include a video monitor that is mounted on the housing and which is electrically connected to the camera, for displaying an image of the person so that the person can alter his pose as desired prior to taking the person's portrait. Additionally, a currency acceptor can be attached to the apparatus and operatively engaged, with the camera and printer, to activate the camera and printer upon insertion of an appropriate amount of currency into the acceptor.

A further understanding of the nature and advantages of the inventions herein may be realized by reference to the remaining portions of the specification and the attached drawings.

DESCRIPTION OF THE PREFERRED EMBODIMENTS

Figure 1:
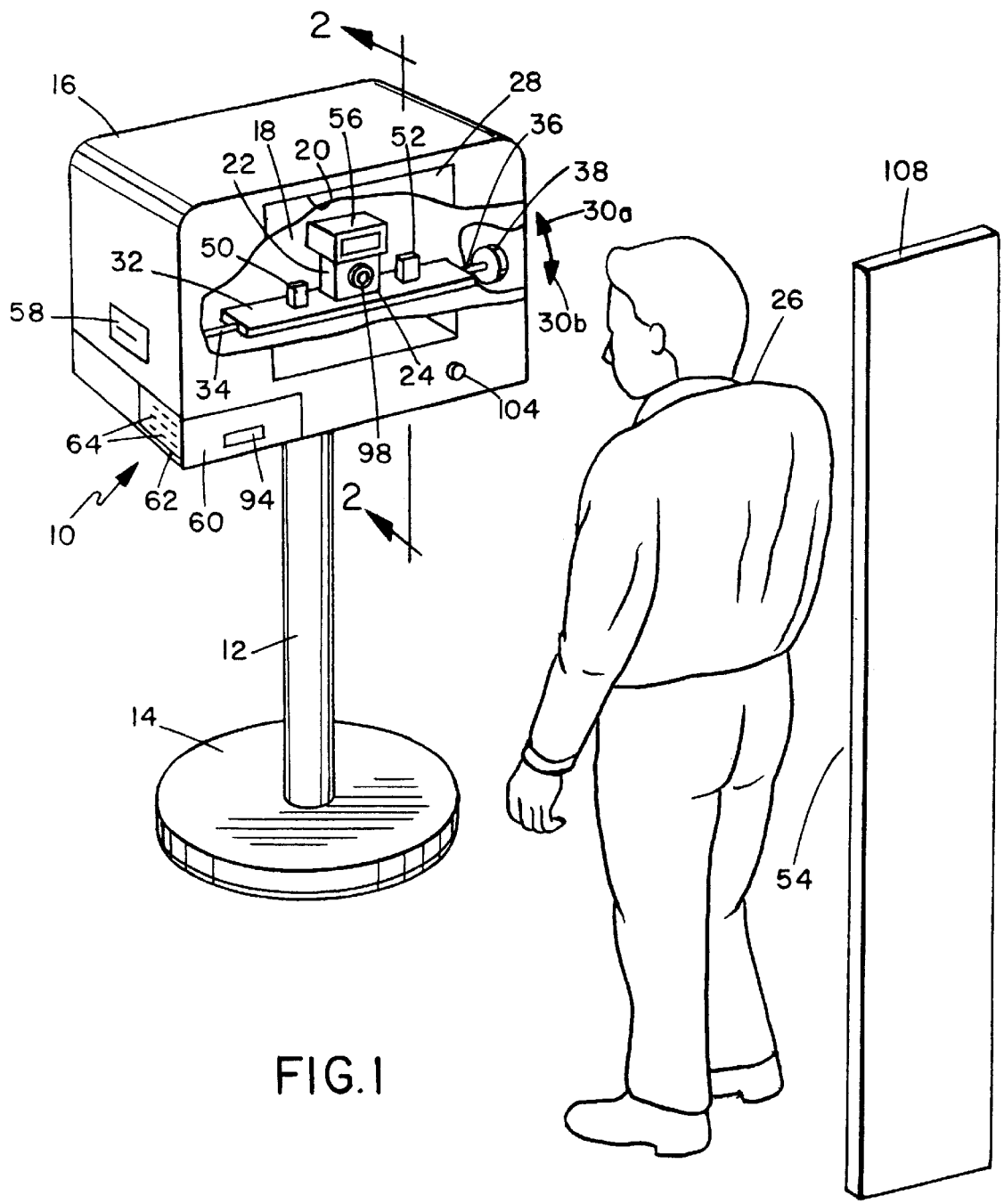
FIG. 1 is a perspective view of the novel electronic imaging apparatus of the present invention, seen in one intended environment, with portions cut away for clarity and with portions shown in phantom.

Referring initially to FIG. 1, an electronic imaging apparatus is shown, generally designated 10. In accordance with the present invention, the apparatus 10 is intended to be used to produce an electronic image of a person against a predetermined background. As shown, the apparatus 10 includes a base 12 which is mountable on a surface 14. The base 12 supports a lightweight, portable, watertight fiberglass housing 16 above the surface 14. As shown, the housing 16 is sufficiently compact to permit convenient installation of apparatus 10 in a wide variety of locations which may have limited space available for imaging equipment. For example, the base 12 can be dispensed with, and the housing 16 mounted on a counter top or other suitable surface (not shown).

FIG. 1 shows that the housing 16 is formed with an enclosure 18, and that the enclosure 18 defines an opening 20. A camera 22 (shown schematically in FIG. 2) is mounted on the housing 16, and, as shown in FIG. 1, a lens 24 of the camera 22 is positioned such that the field of view of the lens 24 is oriented toward the opening 20. Also, the lens 24 is preferably focused at the location of an operator 26 when the operator 26 is properly positioned in front of the apparatus 10, i.e., at about an arm's length (three to four feet) from the apparatus 10. In one preferred embodiment, the camera 22 can be a suitable still camera manufactured by Kodak or a suitable video camera manufactured by Hitachi Corporation under the trade name VK-C360. Preferably, the camera 22 is enclosed in the housing 16 to shield the camera 22 from the elements. For example, an opaque smoked-glass cover 28 can be attached to the housing 16 to cover the opening 20.

Apart from the specific type of device used for the camera 22, the camera lens 24 is preferably movably mounted on the housing 16. Specifically, as shown in FIG. 1, the camera lens 24 can be moved up and down on the housing 16 (i.e., in the directions indicated by arrows 30a, 30b) by the operator 26, whose image is to be taken by the camera 22. More specifically, as shown in FIG. 1, the camera 22 is positioned on a shelf 32, and the shelf 32 is in turn attached to two shafts 34, 36, each of which is rotationally connected to the housing 16. In accordance with the present invention, the shaft 36 extends through the housing 36 and is connected to a knob 38. The operator 26 can grasp the knob 38 and rotate the knob 38 to move the lens 24. Preferably, the knob 38 has a scale (not shown) printed or deposited thereon for indicating to the operator 26 the orientation of the knob 38 relative to the housing 16 that is appropriate for the height of the operator 26.

Figure 2:
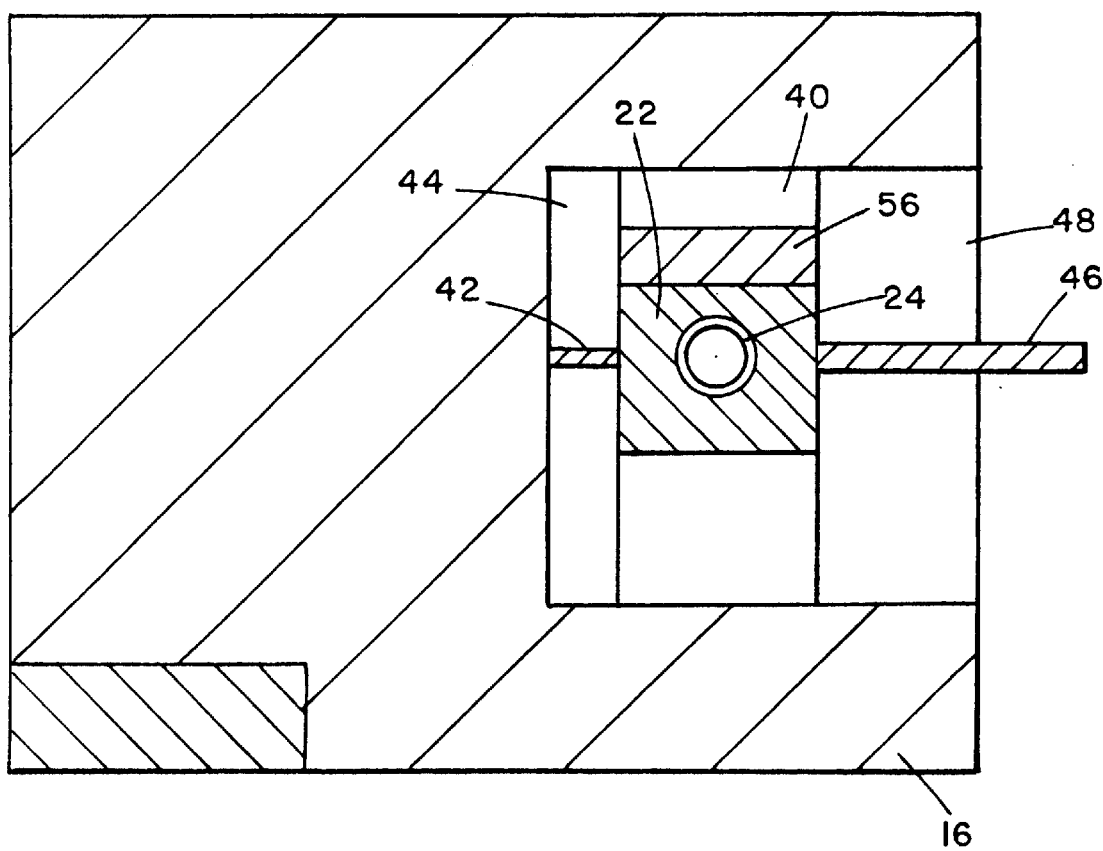
FIG. 2 is a cross-sectional view of an alternate embodiment of the novel electronic imaging apparatus of the present invention, as would be seen along the line 2—2 in FIG. 1.

FIG. 2 shows an alternative means by which the camera 22 can be movably mounted in the housing 16. More particularly, as shown in FIG. 2, the camera 22 can be positioned in a channel 40 which is formed in the housing 16, and the camera 22 can move up and down in the channel 40. In the alternative embodiment shown in FIG. 2, a peg 42 is attached to the camera 22, and the peg 42 is slidably engaged with a groove 44 which is forward in the housing 16. Likewise, a handle 46 is connected to the camera 22 and is slidably engaged with a slot 48 that is forward in the housing 16. In accordance with the present invention, the peg 42 establishes an interference fit with the groove 44, and the handle 46 establishes an interference fit with the slot 48, to hold the camera 22 stationary with respect to the housing 16 when the operator 26 is not manipulating the handle 46. The operator 26 can, however, manipulate the handle 46 to overcome the frictional force between the peg 42, groove 44 and the handle 46, slot 48 to thereby move the camera 22 up and down within the housing 16.

Referring back to FIG. 1, two light sources 50, 52 are shown mounted on the housing 16. The sources 50, 52 are distanced from each other. Each of the light sources 50, 52 is electrically connected to a source of electricity (not shown in FIG. 1) and each can be activated to generate a flash of light and direct the flash of light to illuminate the operator 26 when the camera 22 is activated. Preferably, the light sources 50, 52 are synchronized with the camera 22 to generate a flash of light immediately prior to the camera 22 imaging the operator 26.

Thus, it is to be understood that the operator 26 is illuminated from two directions. It is to be further understood that the focal point of the lens 24 of the camera 22 is preferably established to coincide with the position of the operator 26 when the operator 26 is standing at about an arm's length distance from the lens 24. Consequently, the combined effect of the sources 50, 52 and the focusing of the lens 24 as described enables the camera 22 to generate an electronic image in which the image of the operator 26 is relatively sharp and defined. In contrast, the image generated by the camera 22 of the actual background surroundings 54 in which the operator 26 is standing is relatively blurred and insufficiently lit.

FIG. 1 also shows that a video monitor 56 can be mounted on the apparatus 10 and electrically connected to the camera 22 for generating a display of the field of view of the lens 24. Accordingly, the operator 26 can position the camera 22 as desired relative to the housing 16 and view, on the monitor 56, the image that will be produced by the camera 22 when the camera 22 is activated.

Additionally, FIG. 1 shows that a currency acceptor 58, such as a Rowe OB-A4 currency acceptor, can be attached to the housing 16 and operatively engaged with the camera 22. More specifically, currency can be deposited into the currency acceptor 58, and when a predetermined amount of currency has been deposited, currency acceptor 58 sends a signal to the control electronics of the camera 22 to activate the camera 22. For purposes of the present invention, currency can be cash, tokens, scrip or credit cards.

Furthermore, FIG. 1 shows that an electronics component casing 60 is mounted on the housing 16. As envisioned by the present invention, that the casing 60 includes an electronic printer 62 and associated electronic equipment, as more fully disclosed below. In one embodiment, the printer 62 is a Kodak SV6510 video printer. The printer 62 is electrically connected to the camera 22 for electronically producing a hard copy of the image generated by the camera 22.

More particularly, the printer 62 contains a plurality of sheets 64 (shown in phantom) of a suitable substrate material, and the printer 62 electronically prints the image of the operator 26 onto one or more of the sheets 64. In the preferred embodiment, each of the sheets 64 has a predetermined background image 66 (shown best in FIG. 5 by region 92) preprinted thereon. Although the illustrated embodiment relates to the printing of one image per sheet, note that any number of images may be printed on a sheet. For example, a "sticker" sheet backed with pressure-sensitive adhesive and a peelable protective layer may be preprinted with an array of two, four, 16 or any other number of background images, separated from one another along score lines that allow individual stickers to be peeled away from the sheet. Directing a printer board to print an image on each sticker of such a sheet is well-within the abilities of one skilled in the art.

Figure 3:
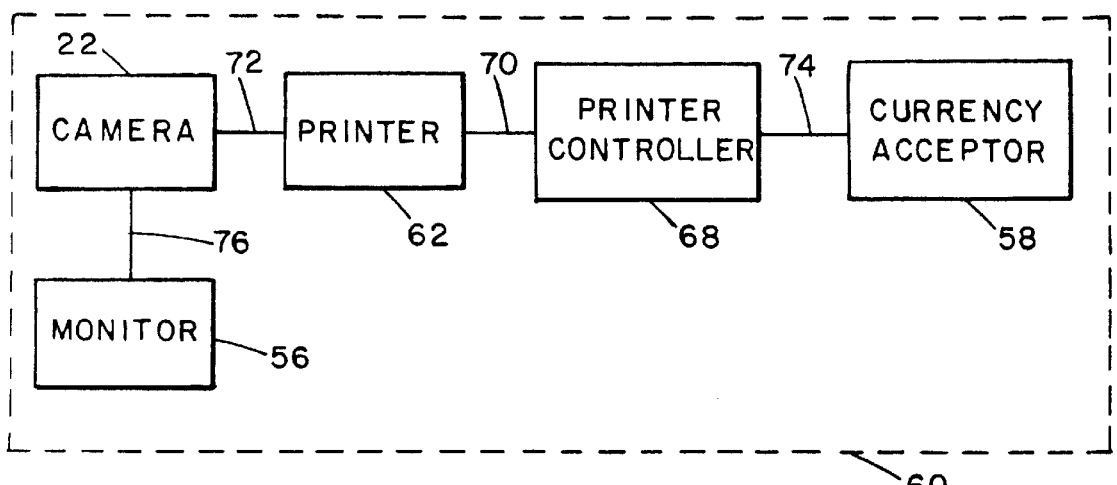
FIG. 3 is a block diagram showing the electrical components of the novel electronic imaging apparatus of the present invention.

Now referring to FIG. 3, the details of the electronic components contained in the casing 60 are shown to include a microprocessor, for example, printer controller 68. As shown, the printer controller 68 is electrically connected to the printer 62 via a line 70, and the printer 62 is in turn electrically connected to the camera 22 via a line 72. Also, the printer controller 68 is electrically connected to the currency acceptor 58 via a line 74, and the monitor 56 is electrically connected to the camera 22 via a line 76. it will be appreciated by the skilled artisan that other peripheral electronic components may also be included in the casing 60, such as, for example, power adapters for converting direct current from a battery (not shown) to alternating current.

Figure 4:
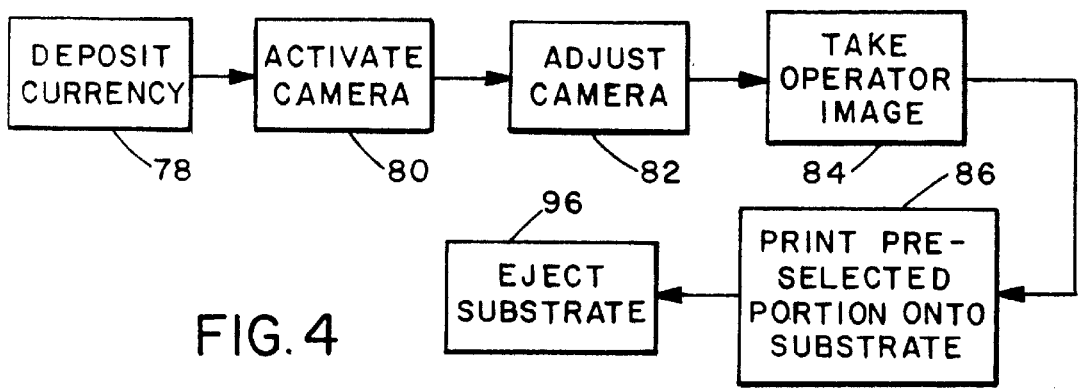
FIG. 4 is a block diagram showing the method of operation of the apparatus shown in FIG. 1.

In the operation of the apparatus 10, reference is made to FIGS. 1, 3, and 4. As shown in FIG. 1 and as indicated at block 78 of FIG. 4, the operator 26 initially deposits a predetermined amount of currency (not shown) in the currency acceptor 58. Upon insertion of the currency, the acceptor 58 sends a signal to the printer controller 68 via the line 74, to activate the controller 68 and the camera 22, as indicated at the block 80. Then, the operator 26 can be prompted (e.g., by a message displayed on the monitor 56) to position himself an appropriate distance from the camera lens 24 and adjust the position of the camera 22 relative to the operator 26 at about eye level, as indicated at block 82.

After the operator 26 has deposited the appropriate amount of currency in the acceptor 58, the printer controller 68 waits a preselected time period and then causes the camera 22 to image the operator 26. More specifically, the printer controller 68 causes each of the light sources 50, 52, which are synchronized with the camera 22, to generate a flash of light to illuminate the operator 26. As indicated at the block 84 in FIG. 4, the camera 22 images the operator 26 immediately after the sources 50, 52 have illuminated the operator 26. In accordance with the present invention, the camera 22 generates an image of the operator 26 after a preselected time period which can be measured from the depositing of the currency in the acceptor 58 or some other user-generated signal.

The generated image from the camera 22 is sent from the camera 22 to the printer 62. As indicated at block 86 in FIG. 4, the controller 68 causes the printer 62 to print a preselected portion of the image from the camera 22 onto one of the sheets 64. Specifically, referring for the moment to FIG. 5, a preselected portion 88 of the field of view of lens 24 which is imaged by the camera 22 is shown to preferably include the focused image of the operator 26, and may also include unfocused portions of the actual background in which the operator 26 is located. The printer controller 68 causes the printer 62 to print the preselected portion 88 in a predetermined blank area 90 of the sheet 64. More specifically, it will be appreciated by the skilled artisan that the printer 62 includes a sensor which scans the entire image generated by the camera 22 for sensing the image to be printed by the printer 62. The printer controller 68, however, electronically suppresses those portions of the field of view of the lens 24 which do not coincide with the preselected portion 88. The printer controller 68 does this by electronically preventing the printer 62 from printing those areas which are outside the preselected portion 88. In contrast, the printer controller 68 does not suppress the preselected portion 88, so that the printer 62 prints the portion 88 in the area 90 of the sheet 64.

Figure 5:
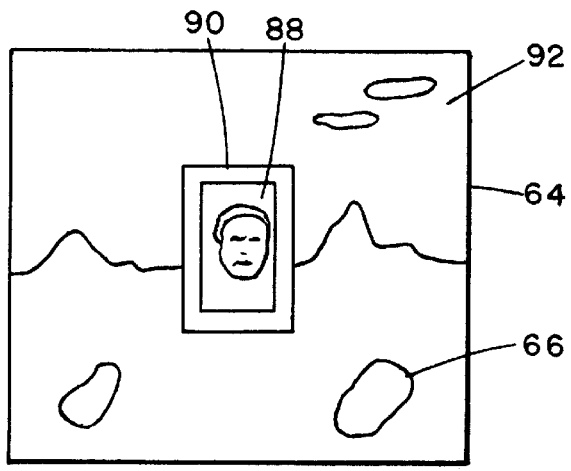
FIG. 5 is a schematic diagram of a substrate which has been processed by the apparatus shown in FIG. 1.

As contemplated by the present invention and shown in FIG. 5, region 92 (the area outside portion 88) of the sheet 64 includes an image of a predetermined background 66 preprinted thereon. This predetermined background could be appropriate for a postcard, identification card, or entertainment card, and can include alpha-numeric characters. Thus, the electronic image which is formed on the sheet 64 includes the operator 26 superimposed over the image of the predetermined background which is printed on the region 92 of the sheet 64. After generating an electronic image of the operator 26 against the predetermined background on the sheet 64, the printer 62 ejects the sheet 64 toward the operator 26 through a slot 94, as indicated at block 96, and the apparatus 10 is reset for another operational cycle.

Referring back to FIGS. 1 and 3, the printer control board can be omitted from the apparatus 10, and the apparatus 10 can then include a template 98 which can be operatively engaged with the lens 24 to truncate the field of view of the lens 24. In other words, the preselected portion 88 (shown in FIG. 5) of the field of view of the lens 24 can be mechanically established by the template 98. The remainder of the structure and operation of the apparatus 10 in this alternate embodiment would be substantially as disclosed above.

Figure 6:
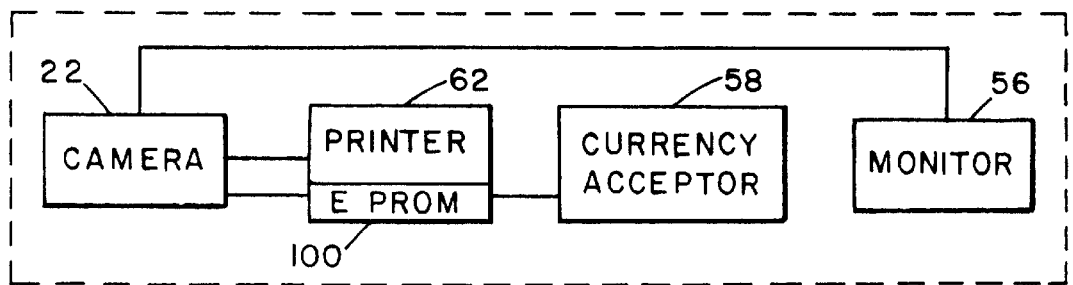
FIG. 6 is a block diagram of the electronic components of an alternate embodiment of the novel electronic imaging apparatus.

Now referring to FIG. 6, in another alternate embodiment, printer controller 68 can be omitted, and the microprocessor of the present invention can be an EPROM 100 housed with the printer 62 and electrically connected to the printer 62. In this embodiment, the printer 62 in turn is electrically connected to the camera 22. As envisioned by the present invention, the memory of the EPROM 100 can be programmed to cause the sensor (not shown) of the printer 62 to scan only the preselected portion 88 (shown in FIG. 4) of the field of view of the lens 24 and to electronically print the portion 88 into the predetermined area 90 of the sheet 64. Because the sensor of the printer 62 only scans the preselected portion 88, and not the entire field of view of lens 24, the printer 62 can relatively quickly (i.e., in about twenty seconds) produce an image of the operator 26 superimposed onto the predetermined background which is preprinted on the sheet 64.

Figure 7:
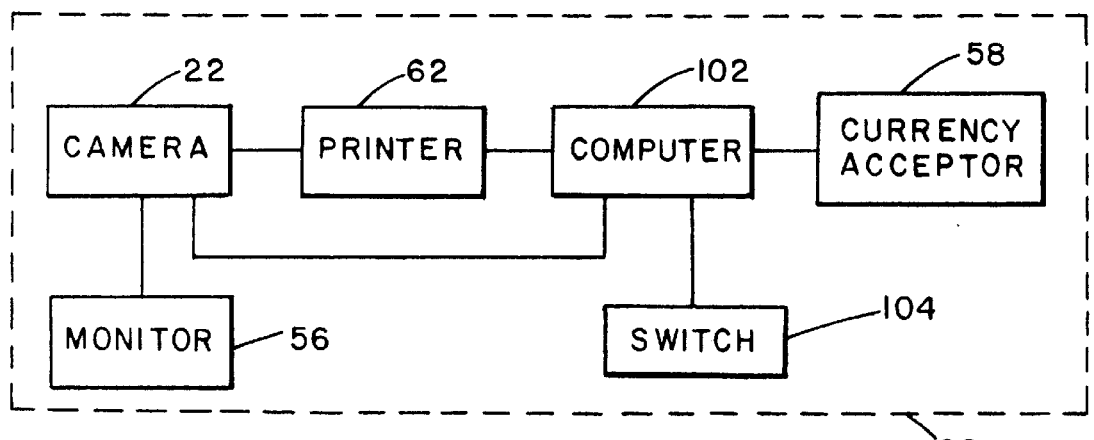
FIG. 7 is a block diagram of the electronic components of yet another alternate embodiment of the novel electronic imaging apparatus.

Now referring to FIG. 7, the electrical components of another alternate embodiment of the present invention are shown. More specifically, in the embodiment shown in FIG. 7, the microprocessor of the present invention is a personal computer or lap-top computer 102. In this embodiment, the computer 102 is electrically connected to the camera 22 and the currency acceptor 58. When a predetermined amount of currency is deposited into the currency acceptor 58, the currency acceptor 58 sends a signal to the computer to initiate an imaging process. Upon receipt of the signal from the currency acceptor 58, the computer 102 causes the camera 22 to generate an image of the operator 26 and to print this image onto one of the sheets 64 which are preprinted with a predetermined background image.

While the above discussion disclosed that the computer 102 can control the printer 62 to print an image of the operator 26 onto a sheet 64 which has a background 66 preprinted thereon, it is to be appreciated that the sheet 64 in this embodiment may alternatively be initially blank. More particularly, electronic code which is representative of the background 66 can reside in the electronic memory of the computer 102. In this embodiment, the computer 102 can cause the printer 62 to print both the portion 88 and the background 66 that is resident in the electronic memory of the computer 102 onto the sheet 64. Specifically, the computer 102 can be programmed to electronically superimpose the image of the operator 26 onto a predetermined section of the electronically-stored background. The resulting composite image of the operator within the predetermined section of the background plus the background is then printed onto a blank sheet 64 by the printer 62.

Furthermore, the computer 102 can have more than one site-specific background stored in the electronic memory of the computer 102. Accordingly, the present invention can allow the operator 26 to select which of the backgrounds stored in computer 102 he desires to have his image superimposed upon. To this end, FIGS. 1 and 7 show that a selector switch 104 can be mounted on the housing 16 and electrically connected to the computer 102 to permit the operator 26 to select the desired background.

Moreover, the computer 102 can have an operational mode wherein the computer 102 causes the camera 22 to generate multiple (e.g., 4) images of the operator 26. In this mode, the computer 102 causes the printer 62 to print all four images of the operator 26 onto a blank sheet 64. Accordingly, the switch 104 can have settings which correspond to each of the prestored backgrounds, plus a setting which corresponds to the operational mode of the computer 102 wherein multiple images of the operator 26 are printed onto a blank sheet 64.

Figure 8:
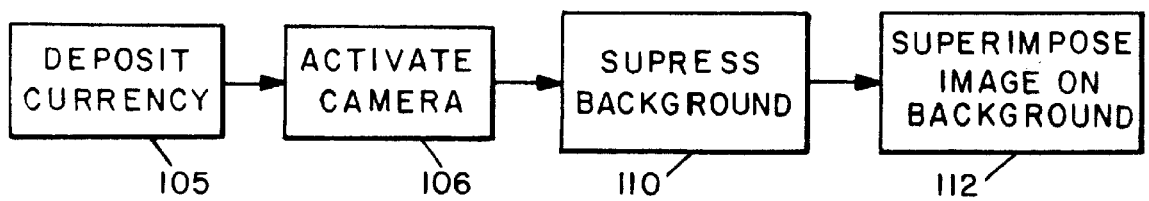
FIG. 8 is a block diagram showing an alternate method of operation of the apparatus of the present invention.

In yet another alternate embodiment, the computer 102 can generate an image of the operator 26 against a site-specific background by the process familiarly known as Chromakey. More particularly, referring to FIG. 8, the operator 26 deposits a predetermined amount of currency into the acceptor 58, as indicated at block 105 in FIG. 8. Upon insertion of the currency into the acceptor 58, the acceptor 58 sends an electrical signal to the computer 102, as indicated at block 106, and, after a preselected time period, the computer 102 causes the camera 22 to image the operator 26. For this embodiment, the operator 26 stands between a monochrome background 108 and the apparatus 10. Preferably, the color of the background 108 is a predetermined shade of blue, and the background 108 can be a rigid, portable or fixed surface or a curtain.

In accordance with Chromakey procedures, the image of the operator 26 on a background 108 is sent to the computer 102. As indicated at block 110, the computer 102 electronically suppresses the image of the background 108 by removing that color. More specifically, if the background is a uniform color or hue such as a predetermined blue, the computer 102 electronically suppresses portions of the image from the camera 22 which are characterized by the predetermined blue color and which are juxtaposed with other portions of the image that also have the predetermined color. Thus, the image of the operator 26 is essentially electronically isolated from the image of the background 108 by the computer 102. The suppression of the background 108 from the image generated by camera 22 may be accomplished by the software, firmware, or hardware of the computer 102.

Further, as indicated at block 112, the computer 102 superimposes the isolated image of the operator 26 over any part of one of a plurality of backgrounds that can be stored in the electronic memory of the computer 102. The particular background used can be selected by the operator 26 by appropriately manipulating the switch 104. The computer 102 can superimpose the image of the operator 26 over a preselected area of the stored background. Alternatively, the computer 102 can superimpose the image of the operator 26 over any area of the stored background in response to the position of the operator 26 relative to the lens 24. The printer 62 then prints the resulting composite image of the operator 26 with one of the preselected backgrounds onto the sheet 64.

In an alternate embodiment, the color of background 108 and a non-printing color of printer 62 are coordinated. In such an embodiment, the complexity of computer 102 and associated firmware is greatly reduced. With a reduced complexity, the apparatus can be made smaller, more portable and cheaper, as is explained below.

Suppose background 108 is selected to be white, and white is a color which printer 62 indicates by not printing anything. Thus where an image to be printed contains white pixels, printer 62 reacts to those white pixels by skipping the corresponding locations on a printed page, with the assumption that the underlying page is white and will fill those corresponding locations with white. Using white paper to show white pixels is in fact required by a popular color printing standard, CYMK, which produces color dots by the combination of C-cyan, Y-yellow, M-magenta and K-black dots for non-white colors.

By matching a white background with a printer which does not print white dots, and printing the image from camera 22 without separating the image of the background from the foreground image in a computationally costly image processing step, and printing the image (foreground and background) onto a card with a pre-printed background, a card results in an image of a person in the foreground appearing in front of a pre-selected background other than the actual background behind the person.

The inks or toners used for the colors of the foreground image should be opaque, so as to obscure the portions of the pre-printed image which fall behind the foreground image. One additional benefit of such a system where the background color is matched to a non-printing color of the printer is that where a pixel partially covers both the foreground image and the background image, the amount of ink or toner applied for that pixel is reduced, thus allowing some of the color of the pre-printed background to show through. This effect causes a smooth transition between the pre-printed background image the foreground image, as would occur if the subject were in fact imaged in front of the scene shown in the pre-printed background.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An apparatus for electronically forming on a substrate a combined image of a subject and a background, comprising:

a housing having an opening;

a camera mounted in the housing and having a field of view directed toward said opening and directable toward a subject outside the housing, the camera producing electronic camera signals representing an image within said field of view, said image comprising a plurality of pixels;

an image suppression circuit mounted in the housing and connected to the camera to receive said electronic camera signals, the image suppression circuit comprising software means for comparing adjacent pixels of said image, and producing electronic printer signals representing a resulting image in which areas having adjacent pixels of like color bordering said subject are suppressed;

a printer mounted in said housing, the printer receiving said electronic printer signals and printing said resulting image upon said substrate; and a base support having a central region and a vertical, elongate post projecting upwardly from the central region of said base support, the vertical post having an upper end and the portable housing being mounted on the upper end of said vertical post at a location spaced above said base support, and the portable housing being of larger cross-sectional dimensions than said post.

2. An apparatus for electronically forming on a substrate a combined image of a subject and a background, comprising:

a housing having an opening;

a white backdrop positioned outside said housing in front of said opening;

a camera in said housing having a field of view directed toward said opening and directable toward said white backdrop, with said subject positioned between said camera and said white backdrop, said camera producing electronic camera signals representing an image within said field of view, said image comprising a plurality of pixels;

an image suppression circuit in said housing receiving said electronic camera signals and producing electronic printer signals representing a resulting image in which areas bordering said subject are encoded as white pixels in said electronic printer signals; and a printer receiving said electronic printer signals and printing said resulting image upon said substrate, said printer responding to a white pixel in said electronic printer signals by not printing anything on said substrate at a location of said pixel.

3. The apparatus as claimed in claim 2, wherein the housing is a portable, stand-alone unit and is not associated with a booth completely enclosing the housing and backdrop.

4. The apparatus recited in claim 2, wherein said image suppression circuit comprises a microprocessor.

5. The apparatus as claimed in claim 4, wherein the microprocessor comprises a printer control board.

6. The apparatus recited in claim 2, wherein said printer prints said resulting image upon a pre-printed substrate bearing a predetermined background image, and said printer prints said resulting image upon an area of said substrate not bearing said predetermined background image.

7. The apparatus recited in claim 6, wherein said substrate comprises a postcard.

8. The apparatus recited in claim 6, wherein said substrate comprises a sticker.

9. The apparatus recited in claim 2, wherein:

said image suppression circuit comprises a memory storing electronic background signals representing a plurality of predetermined background images selectable by a user; and said printer prints upon said substrate both said resulting image and a predetermined background image selected by said user.

10. The apparatus recited in claim 9, wherein said substrate comprises a postcard.

11. The apparatus recited in claim 9, wherein said substrate comprises a sticker.

12. A method for electronically forming on a substrate a combined image of a subject and a background, comprising the steps of:

orienting a camera to direct a field of view of said camera toward said subject positioned between said camera and a white backdrop, said camera producing electronic camera signals representing an image within said field of view, said image comprising a plurality of pixels;

receiving said electronic camera signals;

producing electronic printer signals representing a resulting image in which areas bordering said subject are encoded as white pixels in said electronic printer signals; and printing said resulting image upon said substrate in response to said electronic printer signals, and not printing anything on said substrate at a location of a white pixel.

13. The method recited in claim 12, wherein a microprocessor performs said step of producing electronic printer signals.

14. The method as claimed in claim 12, wherein a printer control board alone performs said step of producing electronic printer signals.

15. The method recited in claim 12, wherein said printing step comprises printing said resulting image upon a pre-printed substrate bearing a predetermined background image, wherein said resulting image is printed upon an area of said substrate not bearing said predetermined background image.

16. The method recited in claim 15, wherein said printing step comprises printing said resulting image upon a substrate comprising a postcard.

17. The method recited in claim 15, wherein said printing step comprises printing said resulting image upon a substrate comprising a sticker.

18. The method recited in claim 12, further comprising the steps of:

storing in a memory electronic background signals representing a plurality of predetermined background images selectable by a user;

said user selecting one of said predetermined background images; and wherein said printing step comprises printing upon said substrate both said resulting image and said selected one of said predetermined background images.

19. The method recited in claim 18, wherein said printing step comprises printing said resulting image upon a substrate comprising a postcard.

20. The method recited in claim 18, wherein said printing step comprises printing said resulting image upon a substrate comprising a sticker.

21. An apparatus for electronically forming on a substrate a combined image of a subject and a background, comprising:

a portable housing having an opening;

a camera mounted in the housing and having a field of view directed toward said opening and directable toward a subject outside the housing, the camera producing electronic camera signals representing an image within said field of view, said image comprising a plurality of pixels;

an image suppression circuit mounted in the housing and connected to the camera to receive said electronic camera signals, the image suppression circuit comparing adjacent pixels of said image, and producing electronic printer signals representing a resulting image in which areas having adjacent pixels of like color bordering said subject are suppressed; and a printer mounted in said housing, the printer receiving said electronic printer signals and printing said resulting image upon said substrate; and the housing being a portable, stand-alone unit which is not associated with a booth completely enclosing the housing and subject.

22. The apparatus as claimed in claim 21, wherein the subject may be positioned in front of any selected background surface.

23. The apparatus recited in claim 21, wherein said image suppression circuit comprises a microprocessor.

24. The apparatus as claimed in claim 23, wherein the microprocessor comprises a printer control board for electronically suppressing portions of the field of view of the camera outside a predetermined portion of the field of view corresponding to the subject.

25. The apparatus as claimed in claim 23, wherein the microprocessor comprises a personal computer.

26. The apparatus recited in claim 21, wherein:
   said image suppression circuit comprises a memory storing electronic background signals representing a plurality of predetermined background images selectable by a user; and
   said printer prints upon said substrate both said resulting image and a predetermined background image selected by said user.

27. The apparatus recited in claim 26, wherein said substrate comprises a postcard.

28. The apparatus recited in claim 26, wherein said substrate comprises a sticker.

29. An apparatus for electronically forming on a substrate a combined image of a subject and a background, comprising:
   a housing having an opening;
   a camera mounted in the housing and having a field of view directed toward said opening and directable toward a subject outside the housing, the camera producing electronic camera signals representing an image within said field of view, said image comprising a plurality of pixels;
   an image suppression circuit mounted in the housing and connected to the camera to receive said electronic camera signals, the image suppression circuit comprising software means for comparing adjacent pixels of said image, and producing electronic printer signals representing a resulting image in which areas having adjacent pixels of like color bordering said subject are suppressed;
   a printer mounted in said housing, the printer receiving said electronic printer signals and printing said resulting image upon said substrate; and
   the image suppression circuit comprising an EPROM housed with the printer and electrically connected to the printer, the EPROM being programmed to cause the printer to scan only a preselected portion of the field of view of the camera corresponding to the subject and to print only the scanned portion upon said substrate.

30. The apparatus recited in claim 29, wherein said printer prints said image upon a pre-printed substrate bearing a predetermined background image, and said printer prints said image upon an area of said substrate not bearing said predetermined background image.

31. The apparatus recited in claim 30, wherein said substrate comprises a postcard.

32. The apparatus recited in claim 30, wherein said substrate comprises a sticker.

33. A method for electronically forming on a substrate a combined image of a subject and a background, comprising the steps of:
   orienting a camera to direct a field of view of said camera toward said subject and background;
   said camera producing electronic camera signals representing a single image within said field of view, said image comprising a plurality of pixels;
   receiving said electronic camera signals;
   using software means only to compare adjacent pixels of said single image and to produce electronic printer signals representing a resulting image in which areas in said single image having adjacent pixels of like color bordering said subject are suppressed; and
   printing said resulting image upon said substrate in response to said electronic printer signals;
   wherein said steps of receiving said electronic camera signals, comparing adjacent pixels of said image, and producing electronic printer signals are all carried out by a printer control board programmed to electronically suppress portions of the image which do not coincide with the subject.

34. The method recited in claim 33, wherein a microprocessor performs said step of producing electronic printer signals.

35. The method recited in claim 33, wherein said printing step comprises printing said resulting image upon a substrate bearing a predetermined background image, wherein said resulting image is printed upon an area of said substrate not bearing said predetermined background image.

36. The method recited in claim 35, wherein said printing step comprises printing said resulting image upon a substrate comprising a postcard.

37. The method recited in claim 35, wherein said printing step comprises printing said resulting image upon a substrate comprising a sticker.

38. The method recited in claim 33, further comprising the steps of:
   storing in a memory electronic background signals representing a plurality of predetermined background images selectable by a user; and
   said user selecting one of said predetermined background images;
   wherein said printing step comprises printing upon said substrate both said resulting image and said selected one of said predetermined background images.

39. The method recited in claim 38, wherein said printing step comprises printing said resulting image upon a substrate comprising a postcard.

40. The method recited in claim 38, wherein said printing step comprises printing said resulting image upon a substrate comprising a sticker.

* * * * *